United States Patent [19]
Byrd et al.

[11] Patent Number: 5,928,545
[45] Date of Patent: Jul. 27, 1999

[54] CURE SHRINKAGE MEASUREMENT

[75] Inventors: Stanley G. Byrd; Herbert M. Swett, both of Inyokern, Calif.

[73] Assignee: The United States of America as represented by the Secretary of the Navy, Washington, D.C.

[21] Appl. No.: 08/914,012

[22] Filed: Jul. 23, 1997

[51] Int. Cl.$^6$ ...................................................... H05B 1/02
[52] U.S. Cl. ......................... 219/497; 219/502; 219/494; 356/379; 356/357; 250/559.21
[58] Field of Search ................................... 219/502, 497, 219/494, 505; 250/559.19, 559.27, 559.21; 356/372, 379, 357; 73/290 B

[56] References Cited

U.S. PATENT DOCUMENTS

| | | | |
|---|---|---|---|
| 4,417,817 | 11/1983 | Bohme et al. | 356/380 |
| 5,251,482 | 10/1993 | Bates et al. | 73/290 V |
| 5,652,432 | 7/1997 | Yaginuma | 250/559.06 |

*Primary Examiner*—Mark Paschall
*Attorney, Agent, or Firm*—Stephen J. Church; Gregory M. Bokar; Melvin J. Sliwka

[57] ABSTRACT

The apparatus and method measures the shrinkage of rocket motor propellant that is caused during curing and may control this shrinkage by thermally expanding it to prevent creation of voids and cracks. The apparatus heats the propellant compound during curing. A laser emits radiation onto the compound and a detector receives reflected radiation from the compound and provides signals representative of the size of the volume of the compound. An interconnected indicator provides readouts representative of the size. A temperature controller coupled to a processor and a heater controls the heating of the compound to regulate its thermal expansion and consequent volume. The method calls for heating the compound during curing and radiating it with a laser. Reflected radiation is detected to provide signals representative of the volume. Readouts of the signals represent the relative size of the compound. The signals may be used to control a heater that supplies heat to correspond the compound's curing shrinkage to thermal expansion during the curing process to prevent the creation of voids and cracks. These signals also may be used to control curing in a production oven of other rocket motors made from the same or similar batches of propellant coumpound.

13 Claims, 1 Drawing Sheet

CURE SHRINKAGE MEASUREMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method and apparatus for measuring and controlling shrinkage of compounds. In particular, this invention relates to a method and apparatus for measuring shrinkage of rocket motor propellant that is caused during curing and controlling shrinkage of the propellant by inducing thermal expansion to prevent creation of voids and cracks therein.

Voids and cracks in high energy propellants, such as those used as rocket propellants, are unacceptable. These anomalies, as well as any separation of the propellant from the walls of the rocket motor, cannot be tolerated since they may create catastrophic consequences.

Tests to determine uniformity of propellant compounds used samples of rocket propellant that were cast into polycarbonate beakers. These beakers were placed in an oven that was kept at the same temperature as the ovens that were used to cure the rocket motors. Every day samples were removed from the oven and tested to see if the propellant had started to gel.

One test used a weighted needle that fell into the propellant for fifteen seconds and the depth that the needle went into the propellant was recorded. The assumption was that the cure shrinkage coincided with the gelling of the propellant slurry. Several specimens were tested daily over a number of days. This data was plotted as time v. needle penetration and an educated guess was made regarding the time when the onset of cure shrinkage was to take place. This time was used to initiate a temperature ramp profile in the curing ovens while the motors were baked. This was at best a hit and miss proposition.

Another testing procedure attempted to determine the volume change by measuring buoyancy of the propellant. The propellant was cast into a condom, the condom suspended from a triple beam balance, and the propellant and condom placed in a water bath. As the propellant shrank during curing, the buoyancy would decrease and the balance would register the weight change. In theory everything should have worked. However, while casting the propellant into the condom, it was noticed that the density of the propellant caused condoms to swell to sizes that were generally unmanageable. In addition, the condoms were found to be semipermeable membranes that allowed water to pass into the propellant which would inactivate the isocyanate curative for the binder system in the propellant. This procedure was not satisfactory.

Another test method incorporated a U-shaped tube filled with Mercury and an electronic Linear Variable Differential Transformer (LVDT) to measure volume change. To a degree, the method worked, but there were drawbacks. The sample had to be loaded into the U-shaped tube without introducing voids into the propellant specimen. This turned out to be a potential source for errors. There was also a long and tedious clean up after the test. Furthermore, special precautions had to be taken when working with hot mercury.

Another testing procedure attempted to float the LVDT directly on the uncured propellant, but the weight of the test apparatus usually caused it to sink into the specimen. As a result, the data derived from these attempts were useless.

Thus, in accordance with this inventive concept, a need has been recognized in the state of the art for a more acceptable method and apparatus for measuring shrinkage of propellant compound that is caused during curing and for controlling the thermal expansion and consequent volume of the compound.

SUMMARY OF THE INVENTION

The present invention is directed to providing an apparatus for and method of measuring volume of a compound. A heater heats a compound during curing. A source emits radiation onto a surface of the compound and a detector receives reflected radiation from the surface to provide signals representative of the size of the volume. An indicator coupled to the detector provides readouts representative of the size. The method calls for heating a compound during curing. Emitting radiation onto a surface of the compound and detecting reflected radiation from the surface provides signals representative of the size of the volume that are used for indicating readouts that represent the size of the volume.

An object is to provide a method and apparatus for measuring shrinkage in compounds during curing.

Another object is to provide a method and apparatus for controlling shrinkage in compounds during curing.

Another object is to provide a method and apparatus for measuring change of volume of compounds.

Another object is to provide a method and apparatus for measuring change of volume of compounds with respect to curing temperature and time.

Another object is to provide a method and apparatus for controlling change of volume of compounds.

Another object is to provide a method and apparatus for controlling change of volume of compounds with respect to curing temperature and time.

Another object of the method and apparatus is to prevent the creation of voids and stress cracks during curing of a compound.

Another object is to provide a method and apparatus for measuring and controlling shrinkage of compounds during curing that is fabricated from off-the-shelf components.

Another object is to provide a method and apparatus for measuring and controlling, or regulating, the shrinkage of compounds that corresponds curing shrinkage to thermal expansion during curing.

Still another object is to provide a method and apparatus for controlling, or regulating, the heating rate in curing ovens to reduce the formation of voids and cracks that may otherwise be caused by shrinkage of rocket motor propellant during curing.

These and other objects of the invention will become more readily apparent from the ensuing specification when taken in conjunction with the appended claims.

DESCRIPTION OF THE PREFERRED EMBODIMENT

This invention helps provide safety and reliability during ignition of high energy propellants, such as rocket propellants. It also reduces the creation of voids and cracks that might be created in other compounds during curing.

Solid rocket propellant for rocket motors is a mixture of solid energetic ingredients that are held together by a binder system. The binder systems in modern motors are typically hydroxyl terminated or carboxyl terminated polybutadienes that are cured with some type of catalyst. Typically, the catalyst is an isocyanate. The process for curing these compounds requires that the propellant be cooked in an oven at an elevated temperature. During this curing process, the binder systems start to cross-link at the molecular level. This pulls the molecules together and the volume of the slurry starts to decrease, or shrink, while the slurry is starting to solidify or gel.

Unfortunately, as this happens, voids can be formed in the propellant grain. These voids, if sufficiently large enough, will cause the motor to be rejected upon radiographic inspection, since the voids may cause stress induced fractures and cracks in the propellant grain as the motor ages. When these propellants are ignited, the cracks in the propellant grain can cause the motor to develop internal pressures that exceed the case-limit design pressure and the motor explodes before getting to its intended destination. This results in a loss of an asset, failure of the mission, and, in the worst case, loss of the launch platform and air crew.

In accordance with this inventive concept, increasing the temperature in the curing oven as the propellant begins to gel increases the volume of the propellant due to the thermal expansion of the propellant. This increasing volume that is due to increased temperature may be made to correspond to the decreasing volume attributed to cure shrinkage of the binder system. In other words, the volume of the propellant slurry would be substantially constant during the cross-linking of the binders. Accordingly, the tendency to create voids and cracks is reduced. Therefore, the method and apparatus of this invention not only capable of measuring the volume or size of the compound, but also permits application of the appropriate temperature increase during the curing process.

Figure 1:
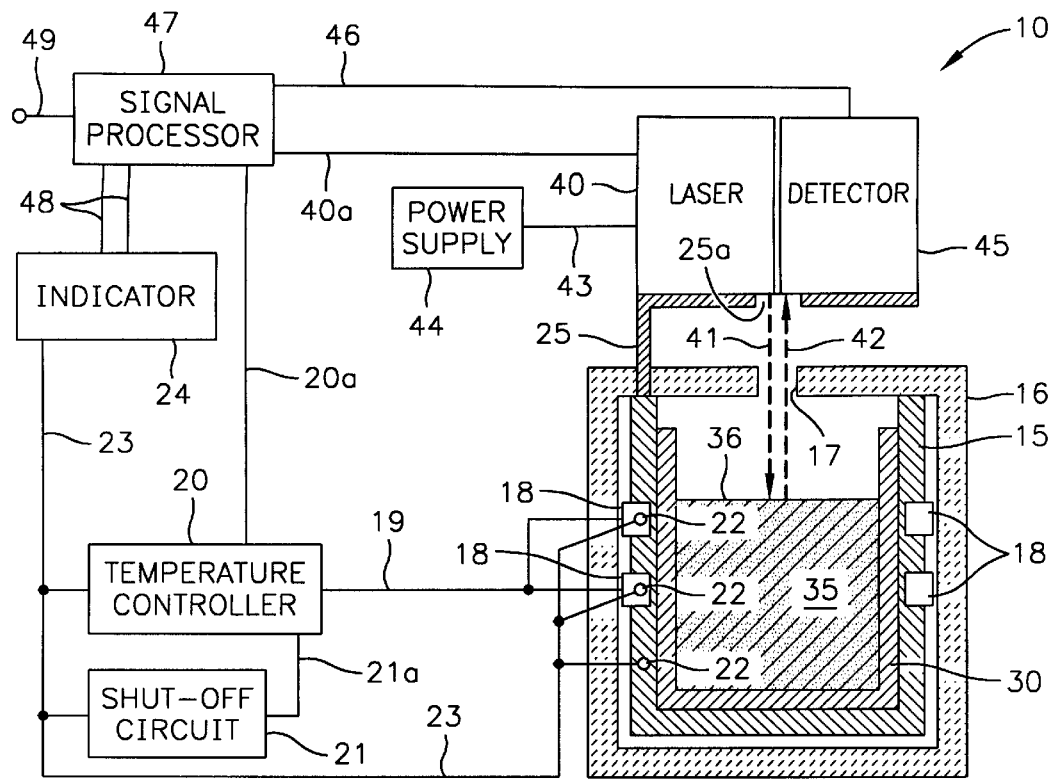
FIG. 1 is a schematic drawing shown partially in cross section of the apparatus of aspects of this invention.

Referring to FIG. 1 of the drawings, measuring apparatus 10 of this invention makes operations safer for those associated with handling and using high energy rocket motor propellants and assures greater operational reliability. Apparatus 10 has a heat-conductive, cup-shaped heating block 15 substantially enclosed by thermally insulating layer 16 that is provided with opening 17. A pair of heater bands or coils 18 are warped about or contained within heating block 15 and function to heat the block and its contents. Heater bands 18 are connected to temperature controller or thermostat 20 via leads 19 which transmits controlled amounts of electrical power from a power source, not shown, to responsively create heat in heater bands 18.

Partially because high energy propellants are being processed, over temperature shut-off circuit 21 is included to interrupt electrical power from controller 20 and heater bands 18. Appropriate shut-off signals are fed to controller 20 via leads 21a. This safety feature is to prevent overheating which might occur if temperature controller 20 or interconnected control circuitry fails, for example.

Heating block 15 is provided with temperature sensors, such as thermocouples 22, which monitor the temperature of propellant 35 in cup-shaped vessel 30 that is inside block 15. Signals representative of the monitored temperature are coupled to leads 23 that extend to controller 20, circuit 21, and indicator 24. Indicator 24 provides a visual or otherwise discernible indication of the monitored information and may be a chart recorder or other suitable readout.

Propellant compound 35 is vacuum cast into cup-shaped propellant vessel 30 in such a manner to substantially remove all voids from the compound. Propellant compound 35 and propellant vessel 30 are then placed inside heating block 15 so that the propellant presents an upwardly facing surface 36.

Adjustable stand 25 is connected to block 15 and supports laser 40 a predetermined distance from propellant 35. Laser 40 is oriented to emit its low power beam 41 of light energy through opening 25a in stand 25, through opening 17 in insulation 16, and onto surface 36 of propellant 35.

Laser 40 is a low power laser such as the model LB-041 marketed by Keyance Inc. of 50 Tice Blvd., Woodcliff Lake, N.J. and receives it's power over leads 43 from interconnected power supply 44. The laser and power supply could be any of many commercially available units. Accordingly, having the teachings of this invention in mind, a designer is free to select suitable units for the job at hand.

Emitted beam 41 shines on surface 36 of propellant 35 and reflected beam 42 bounces back to detector 45 which is located adjacent laser 40. Detector 45 generates signals representative of the elapsed time for beam 41 to reach surface 36 and for reflected beam 42 to reach detector 45. Detector 45 is a model RU3-55R marketed by Keyance Inc. of 50 Tice Blvd., Woodcliff Lake, N.J. Many other suitable models are commercially available. An appropriate choice from well-known detector units is within the purview of one skilled in the art having the teachings of this invention in hand.

The signals generated by detector 45 correspond not only to the elapsed time but also to the distance separating surface 36 from detector 45 and to the volume of propellant 35 in vessel 30. These signals from detector 45 are coupled via leads 46 to laser measurement signal processor 47. Processor 47 transforms the signals to appropriate driving signals that are fed over leads 48 to be visually displayed on indicator 24.

A timing sequence also may be generated in processor 47. This sequence is connected to laser 40 over lead 40a to initiate prearranged spaced sequences of laser emissions during a predetermined period. This period may extend a relatively short time or as much as several days, depending on the properties of the compound being measured and/or cured. The reflections of these emissions will be detected in detector 45 and the generated signals fed to indicator 24 via leads 46 and 48. These signals will show how the volume of propellant compound 35 is changing during the period. Thus, samples of a batch of propellant can be measured and the volume changes and temperatures recorded. This recorded information can be used to process the remainder of the batch so that voids and cracks might be avoided.

As noted above, during curing of the propellent compound, the binder systems start to cross-link at the molecular level to pull the molecules together. Consequently, the volume of the slurry starts to decrease, or shrink, and may create voids in compound 35. However, in accordance with this invention, this shrinkage can be avoided by initiating a corresponding thermal expansion while the slurry is starting to shrink. Processor 47 can control the increase of the temperature of compound 35 in vessel 30 via controller 20 to create the proper amount of thermal expansion of compound 35. Voids and cracks are thereby reduced or substantially eliminated. In addition, the measuring capability of this invention indicates when propellent compound 35 pulls away from or otherwise separates from the inner wall of vessel 30 so that this defective unit may be discarded.

Indicator 24 is depicted as a strip chart recorder; however, any of a variety of storage and/or readouts could be used, such as a computer and computer disc for example. Having the teachings of this invention in mind, one skilled in the art to which this invention pertains would suitably program processor 47 to generate and feed the appropriate control signals over leads 20a to controller 20 when signals from detector 45 indicate that the volume of compound 35 is shrinking as it cures. These control signals actuate controller 20 and heater coils 18 responsively heat compound 35. The heat from heater coils 18 is thereby transmitted to compound 35 to thermally expand the compound and counteract the shrinkage that was detected. It is well within the skill of one skilled in this art to fabricate and program processor 47 so that it continuously reads and records the signals representative of volume changes from detector 45 and initiates temperature changes for heater coils 18 during a predetermined period to avoid creating voids and cracks in curing compounds.

Leads 49 may be included that interconnect processor 27 to a production oven, not shown. The production oven is set up to cure rocket motors containing more of the batch of propellant that has been processed in apparatus 10. Thus, processing data obtained from curing one or more samples in apparatus 10 may be used for real time adjustment of temperature over time to reduce the problems associated with curing shrinkage in production lots of rocket motors.

Figure 2:
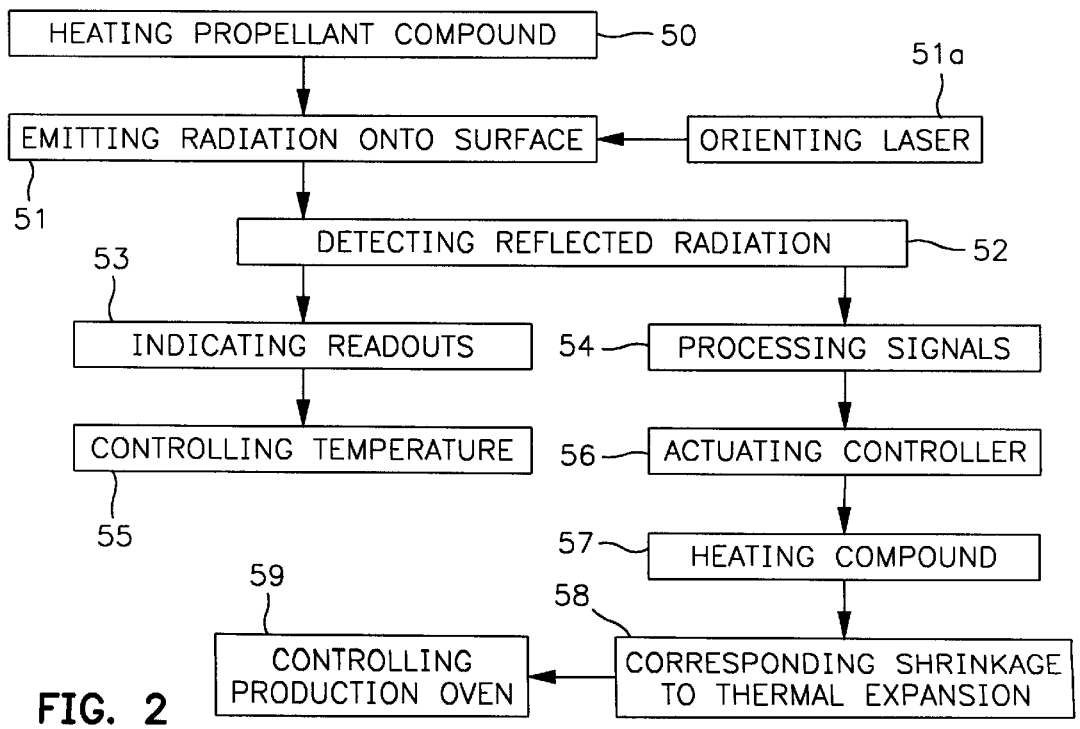
FIG. 2 schematically depicts the method of aspects of this invention.

FIG. 2 depicts salient features of the method of this invention. It calls for heating 50 propellant compound 35 during curing. Next, emitting 51 radiation onto a surface of compound 35 and detecting 52 reflected radiation from the surface provides signals representative of the size of the volume of compound 35 to provide indicating 53 of readouts which are representative of the size. Processing 54 the signals into representative processor signals allows controlling 55 the temperature of the heater to regulate the heating of compound 35. The amount of heating is in response to the processor signals to thereby control the thermal expansion and consequent volume of the propellant compound. The method can be made to include actuating 56 the temperature controller by the processor to cause heating 57 compound 35 and a consequent corresponding 58 of curing shrinkage to thermal expansion of the propellant compound during the curing process. This actuating can also be employed to effect controlling 59 of temperature over time in a production oven that is curing more of the batch of propellant in other rocket motors. Emitting 51 radiation requires orienting 51a a laser to emit the radiation through an opening in insulating layer and onto the surface of the propellant compound.

The apparatus and method of this invention rely on a small temperature controlled vessel to hold and continuously measure the volume change of the propellant using a laser. The laser places no weight on the specimen as the LVDT did during some of the attempts to measure the propellant directly. Furthermore, there is no use of Mercury, and there may be a continuous readout of the volume v. time that does not require a skilled technician to conduct the monitoring operation.

It should be readily understood that many modifications and variations of the present invention are possible within the purview of the claimed invention. It is therefore to be understood that within the scope of the appended claims the invention may be practiced otherwise than as specifically described.

We claim:

1. An apparatus for measuring volume comprising:

a heater disposed to heat compound during curing thereof;

a source of radiation to emit radiation onto a surface of said compound;

a detector disposed to receive reflected radiation from said surface to provide signals representative of the size of the volume of said compound;

an indicator coupled to said detector to provide readouts representative of said size;

a processor coupled to said detector to convert said signals into representative processor signals; and a temperature controller coupled to said processor and to said heater to control the amount of heat emitted therefrom in response to said processor signals thereby regulating thermal expansion and consequent volume of said compound.

2. An apparatus according to claim 1 in which said processor signals actuate said temperature controller so that said heater supplies heat to correspond curing shrinkage to thermal expansion of said compound during curing.

3. An apparatus according to claim 1 in which said radiation source is a laser and said heater includes heater coils adjacent a vessel containing said compound.

4. An apparatus according to claim 3 further including:

a stand orienting said laser to emit said radiation through an opening in an insulation layer and onto said surface.

5. An apparatus according to claim 4 in which said indicator is a strip chart recorder and said heater block is inside said insulating layer.

6. An apparatus according to claim 4 in which said indicator is a computer with storage disc and said heater block is inside an insulating layer.

7. An apparatus according to claim 4 in which said heater includes a heater block that contains said vessel and has said heater coils mounted thereon.

8. A method of measuring volume comprising the steps of:

heating compound to effect curing thereof;

emitting radiation onto a surface of said compound;

detecting reflected radiation from said surface to provide signals representative of the size of the volume of said compound;

indicating readouts representative of said size;

processing said signals into representative processor signals; and controlling temperature of said heater to control the amount of heat emitted therefrom in response to said processor signals thereby regulating thermal expansion and consequent volume of said compound.

9. A method according to claim 8 further including the steps of:

actuating said temperature controller by said processor signals;

heating said compound; and corresponding curing shrinkage to thermal expansion of said compound during curing.

10. A method according to claim 9 further including the step of:

orienting a laser to emit said radiation through an opening and onto said surface.

11. A method according to claim 10 further including the step of:

enclosing said heating block in an insulation layer having said opening therein.

12. A method according to claim 10 in which said step of emitting is performed by laser emission of said emitted radiation and said step of detecting is by a detector disposed adjacent said laser to receive said reflected radiation.

13. A method according to claim 6 further including the step of:

controlling a production oven with said processor signals.

* * * * *